July 12, 1932.   E. PRICE ET AL   1,867,279
VALVE
Filed March 24, 1930
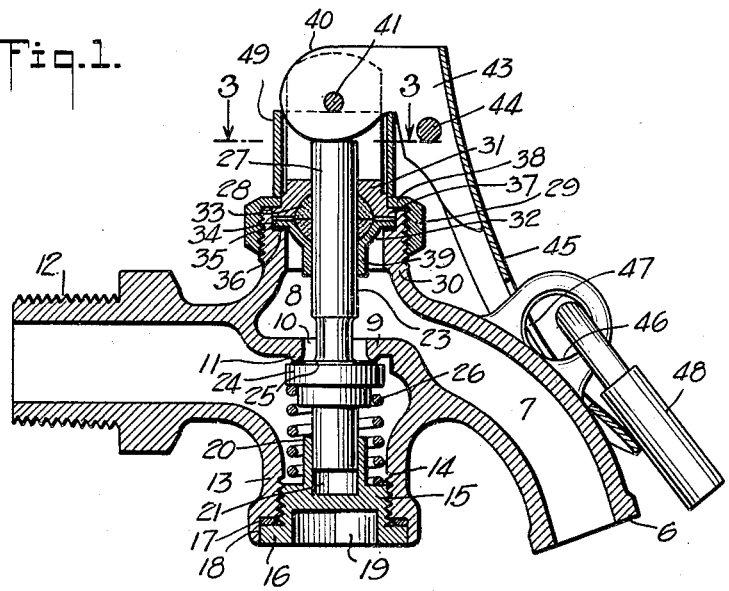
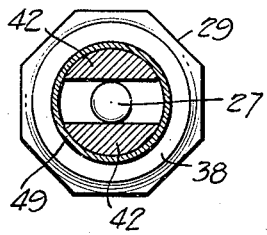
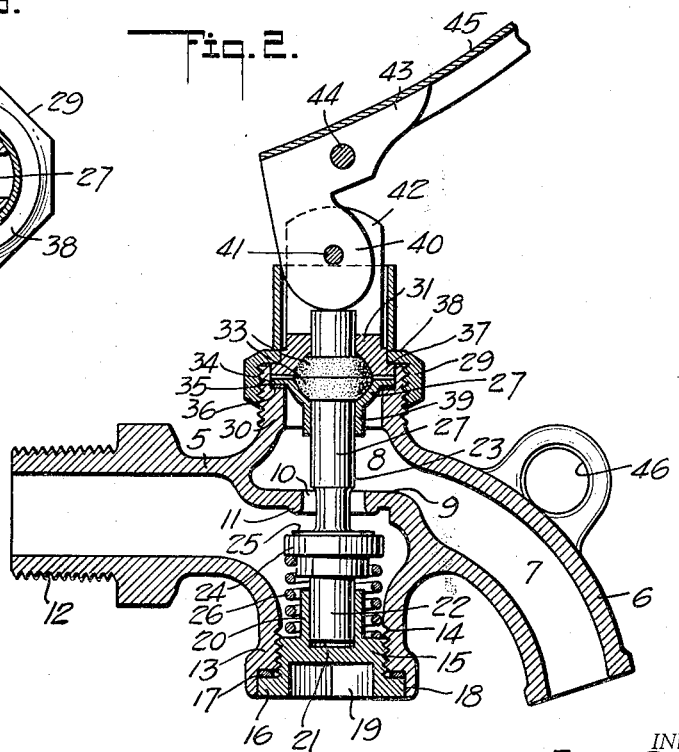
INVENTORS
EMIL PRICE
BY WILLIAM A. PFISTER
ATTORNEYS.

Patented July 12, 1932

1,867,279

UNITED STATES PATENT OFFICE

EMIL PRICE AND WILLIAM A. PFISTER, OF LOS ANGELES, CALIFORNIA

VALVE

Application filed March 24, 1930. Serial No. 438,578.

Our invention relates to valves generally, but is more particularly directed to a form of valve adapted to be used in connection with tanks, reservoirs or receptacles from which hydrocarbon fluids and liquids are dispensed, and an object of the invention resides in the provision of means for mounting a valve stem for reciprocatory movement so as to avoid the damaging and disintegrating effect upon the packing materials which heretofore has been experienced from use of valves of the rotary type.

A further object of the invention resides in the provision of means for protecting the valve packings from undue direct contact with and constant exposure to liquid solvents.

A further object of the invention is to provide a quick and positively acting valve which can only be manipulated by a duly authorized person.

A further object of the invention is to provide a valve which may be held in an open position without requiring manual attention or assistance.

A further object of the invention is to provide a valve whose stem is always sealed with respect to an exterior position so that it cannot be tampered with.

A further object of the invention is to provide a valve consisting of but few operating parts which can be easily assembled or disassembled when the occasion requires.

In the accompanying drawing,

Figure 1 is a vertical section through the valve, showing same closed;

Figure 2 is a similar view showing the valve open;

Figure 3 is a section taken on line 3—3 of Figure 1.

In carrying the invention into practice, we employ a valve body 5 having a downwardly curved nozzle 6 whose orifice 7 opens to a space 8 above a wall or partition 9, the latter having an opening 10 formed therein whose walls merge into a raised annular seat 11. The body is provided with an attaching portion 12 which may be screwed or otherwise suitably secured in the wall of a container from which liquids are to be dispensed.

Disposed in the axial line with the opening 10 and constructed as an integral part of the body 5 is a depending portion 13 interiorly threaded at 14 for the accommodation of a valve stem guide plug 15. The said plug has an annular flange 16 which bears against the sealing washer 17 which is arranged in a recess 18 formed in the extremity of said portion 13. The valve stem guiding plug 15, therefore, comes flush with the lower edge of the said portion 13 so as to be practically invisible to the eye of an observer, thus rendering it more difficult for one to mischievously tamper with these parts. The said plug is formed with a wrench-receiving cavity 19, by means of which the plug can be adjusted to position where it is sealed against the gasket 17. The said plug is formed with an integral cylindrical extension 20 having a bore 21 which receives and guides the lower end 22 of a valve stem 23. This stem passes through the opening 10 and same is formed with a disk 24 which underlies the annular seat 11. The disk carries a packing washer 25 which is yieldingly advanced into position against the seat by means of a spring 26. The spring has one of its ends freely bearing against the under surface of the disk 24, and its opposite end presses lightly against an adjacent face of the valve guiding plug 15. The valve stem is, therefore, mounted for reciprocation with respect to the seat 11.

The stem 23 is provided at its upper end with a cylindrical attenuated extension 27 which passes through a gland 28. This gland 28 comprises a collar 29 threadedly connected with an extension 30 on the valve body 5 and a plurality of mating socket members 31 and 32, the socket of the latter confronting the socket of the former so that sealing disks 33 of compressible packing material may be placed in the socket. The lower member 32 has a flange 34 which rests against a fibrous washer 35 seated upon a shoulder 36. The companion member 31 has a shoulder 37 against which the flange 38 of the collar 29 bears. The two sockets are thus designed so that they may be adjusted relatively in a longitudinal direction so as to compress the packing disks and effect a perfect seal around the extension 27 of the valve stem. The lower socket member 32 is formed with a depending collar 39 which embraces the extension 27 and which guards the packing disks to the extent that they will not be constantly attacked by the action of liquid passing through the valve.

The stem 23 may be adjusted to an open position by means of an eccentric 40 pivoted at 41 between the spaced lugs 42—42 on the upper socket member 31. This eccentric is constructed as an integral part of a metallic arm 43 which is secured at 44 to a metallic manipulating handle 45. The eccentric bears at all times against the free upper extremity of the stem extension 27, and when the eccentric is in the position shown in Figure 1 the valve disk 24 is permanently closed against its seat, it being understood that there is slight clearance between the eccentric and the free upper extremity of the valve stem, in order to permit the gasket 25 to find sealing purchase against the seat 11. When the eccentric is adjusted to the position shown in Figure 2, the entire valve stem is urged to a position against the normal action of the spring 26. The spring 26 need not be of heavy gauge, as it is only necessary when returning the eccentric to a closed position that very slight pressure be urged against the said valve disk 24. Of course, the force of the spring is sufficient to offset the actions of internal pressures set up in the tank or receptacle with which the valve is associated.

The nozzle 6 is formed with an integral eye 46, which accommodates an aperture 47 in the lever 45. This is well illustrated in Figure 1 and when the parts are so associated the bale of a hasp lock 48 may be passed through the eye 46 in order that the lever 45 cannot be tilted. In order to guard the upper portion of the stem 23 against being tampered with from a point outside of the valve structure, we provide a metallic guard 49, whose upper end accommodates the eccentric 40 and whose lower end loosely embraces the socket member 31. When the respective parts occupy the position shown in Figure 1, it is impossible to insert a tool into the valve structure to a position where the valve stem could be depressed.

A valve constructed in accordance with the above is quick and positive-acting, and from the fact that its packing materials are not constantly exposed to the damaging and disintegrating effect of hydrocarbon fluid, the valve is long-lived and is not subject to ready leakage, as would be the case were these packing materials always exposed to the action of fluid in its passage through the valve structure. The valve is extremely simple, inexpensive of manufacture, and same comprises such parts as can be easily assembled when desired or knocked down and worn parts replaced by new ones at small expense.

We claim as our invention:

The combination, with a valve structure including a body portion having a downwardly directed nozzle, a packing gland carried by the body, a reciprocal valve disk contained in the body and provided with a stem, a seat for the disk, means for urging the disk against the seat, a portion of the stem passing through the gland and terminally disposed exteriorly of the body, a cylindrical guard extending about the exterior portion of the stem, an operating lever pivoted to the body and having a manipulating portion adapted to overlie the nozzle, means for locking the lever to the nozzle, and an eccentric portion formed on the lever and contained within the guard and freely bearing against the extremity of the exterior portion of the stem and adapted to depress the stem and to move the disk away from its seat when the lever is tilted in one direction, the cylindrical guard serving to conceal the free extremity of the exterior portion of the stem so as to prevent access being had thereto from a point exteriorly of said guard.

EMIL PRICE.
WILLIAM A. PFISTER.